(12) United States Patent
Torita et al.

(10) Patent No.: US 10,862,131 B2
(45) Date of Patent: Dec. 8, 2020

(54) NONAQUEOUS BATTERY

(71) Applicant: TOYOTA JIDOSHA KABUSHIKI KAISHA, Toyota (JP)

(72) Inventors: Koji Torita, Nagoya (JP); Harunari Shimamura, Toyonaka (JP); Yusuke Fukumoto, Toyonaka (JP); Akihiro Ochiai, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/941,503

(22) Filed: Mar. 30, 2018

(65) Prior Publication Data
US 2018/0301708 A1    Oct. 18, 2018

(30) Foreign Application Priority Data

Apr. 13, 2017   (JP) ................ 2017-079794

(51) Int. Cl.
| | |
|---|---|
| *H01M 4/66* | (2006.01) |
| *H01M 10/0525* | (2010.01) |
| *C22C 21/08* | (2006.01) |
| *C22C 21/02* | (2006.01) |
| *B32B 15/01* | (2006.01) |
| *H01M 10/0587* | (2010.01) |

(52) U.S. Cl.
CPC .......... *H01M 4/667* (2013.01); *B32B 15/016* (2013.01); *C22C 21/02* (2013.01); *C22C 21/08* (2013.01); *H01M 4/662* (2013.01); *H01M 10/0525* (2013.01); *H01M 10/0587* (2013.01); *Y02E 60/122* (2013.01); *Y02T 10/7011* (2013.01)

(58) Field of Classification Search
CPC ........ C22C 21/02; C22C 21/08; H01M 4/662; H01M 4/667; H01M 10/0525; H01M 10/0587; B32B 15/016
See application file for complete search history.

(56) References Cited

U.S. PATENT DOCUMENTS

2007/0281214 A1\*  12/2007  Saruwatari ............ H01M 4/131
                                                                                429/231.95
2008/0248385 A1   10/2008  Matsumura et al.
2014/0170452 A1    6/2014  Abe

FOREIGN PATENT DOCUMENTS

| CN | 103872340 A | 6/2014 |
|---|---|---|
| JP | 2009-064560 A | 3/2009 |
| JP | 2011-014257 A | 1/2011 |

(Continued)

OTHER PUBLICATIONS

JP2011-014257A Espacenet Machine Translation (Year: 2011).\*

*Primary Examiner* — Brittany L Raymond
(74) *Attorney, Agent, or Firm* — Oliff PLC

(57) ABSTRACT

A nonaqueous battery includes a current collector that supports an electrode active material. The current collector includes a first layer, a second layer and a third layer. The second layer is interposed between the first layer and the third layer. The second layer includes 0.3 mass % or more and 1 mass % or less of magnesium and 0.2 mass % or more and 0.9 mass % or less of silicon, with a remainder being made up of aluminum. The first layer and the third layer constitute outer surfaces of the current collector. The first layer and the third layer each include 99.3 mass % or more of aluminum. In both of the first layer and the third layer, there is less than 0.3 mass % of magnesium and less than 0.2 mass % of silicon.

4 Claims, 4 Drawing Sheets

(56) References Cited

FOREIGN PATENT DOCUMENTS

JP          2011014257  A   *   1/2011
WO          2005/076392 A1      8/2005

* cited by examiner

NONAQUEOUS BATTERY

INCORPORATION BY REFERENCE

The disclosure of Japanese Patent Application No. 2017-079794 filed on Apr. 13, 2017 including the specification, drawings and abstract is incorporated herein by reference in its entirety

BACKGROUND

1. Technical Field

The present disclosure relates to a nonaqueous battery.

2. Description of Related Art

Japanese Unexamined Patent Application Publication No. 2009-064560 (2009-064560 A) discloses an aluminum alloy foil for a current collector.

SUMMARY

In order to prevent temperature increase during a nail penetration test, a separator having a shutdown function and the like have been developed.

The present disclosure provides a nonaqueous battery for which temperature increase during a nail penetration test is small and tolerance with respect to high load charging and discharging is high.

The technical scope and operations and effects of the present disclosure will be described below. However, the mechanism of action of the present disclosure includes assumptions. The scope of the claims should not be regarded as being limited according to the accuracy of the mechanism of action.

[1] A nonaqueous battery includes a current collector that supports an electrode active material. The current collector includes a first layer, a second layer and a third layer. The second layer is interposed between the first layer and the third layer. The second layer includes 0.3 mass % or more and 1 mass % or less of magnesium (Mg) and 0.2 mass % or more and 0.9 mass % or less of silicon (Si), with a remainder being made up of aluminum (Al). The first layer and the third layer constitute outer surfaces of the current collector. The first layer and the third layer each include 99.3 mass % or more of Al. In both of the first layer and the third layer, there is less than 0.3 mass % of Mg and less than 0.2 mass % of Si.

The nonaqueous battery of the present disclosure includes a current collector that can prevent temperature increase during the nail penetration test. The current collector has a 3-layer structure. A base layer (second layer) of the current collector is an Al—Mg—Si alloy layer. The Al—Mg—Si alloy constituting the second layer is liable to become embrittled at a high temperature. During the nail penetration test, short circuiting occurs through the nail and Joule heat is generated. Due to the Joule heat, the second layer can melt in the vicinity of a part in which short circuiting has occurred. When the second layer melts, the short circuiting can be quickly disconnected. Thereby, a time for which a short-circuit state continues is expected to be shorter and temperature increase during a nail penetration test is expected to be reduced.

However, the Al—Mg—Si alloy constituting the second layer has a low current collecting capability (electron conductivity). Therefore, when the current collector is composed of only the Al—Mg—Si alloy, tolerance with respect to high load charging and discharging is thought to be low. In addition, the Al—Mg—Si alloy is electrochemically unstable. Therefore, when the current collector is composed of only the Al—Mg—Si alloy, the surface of the current collector is likely to corrode due to oxidation and reduction in the battery. When the surface of the current collector has corroded, the current collector may not be melt easily.

Thus, the current collector of the present disclosure includes the first layer and the third layer. The first layer and the third layer are surface layers that are in contact with an electrode active material. The first layer and the third layer have a smaller content of Mg and Si than the second layer. That is, the first layer and the third layer have a higher current collecting capability than the second layer. Therefore, the nonaqueous battery of the present disclosure can have a higher tolerance with respect to high load charging and discharging.

In addition, the first layer and the third layer are thought to less easily corrode than the second layer. When the first layer and the third layer protect the second layer, prevention of corrosion of the entire current collector can be expected.

As described above, according to the present disclosure, it is possible to provide a nonaqueous battery for which temperature increase during a nail penetration test is small and tolerance with respect to high load charging and discharging is high.

[2] The second layer may include 0.35 mass % or more and 0.8 mass % or less of Mg and 0.3 mass % or more and 0.7 mass % or less of Si, with the remainder being made up of Al. Thereby, tolerance with respect to high load charging and discharging is expected to be improved and temperature increase during a nail penetration test is expected to be reduced.

[3] A proportion of a thickness of the second layer with respect to a thickness of the current collector may be 60% or more and 90% or less. Thereby, temperature increase during a nail penetration test is expected to be reduced.

[4] In both of the first layer and the third layer, there may be 0.1 mass % or less of Mg and 0.1 mass % or less of Si. Therefore, tolerance with respect to high load charging and discharging is expected to be improved and temperature increase during a nail penetration test is expected to be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment (referred to as "the present embodiment" in this specification) of the present disclosure will be described below. However, the following description does not limit to the scope of the appended claims.

For example, a lithium ion secondary battery will be described below as an example of a nonaqueous battery. However, a lithium ion secondary battery is only an example. The nonaqueous battery of the present embodiment is not limited to a lithium ion secondary battery. The nonaqueous battery of the present embodiment may be, for example, a sodium ion secondary battery or a lithium primary battery.

In addition, a current collector of the present embodiment is typically a positive electrode current collector, but it may be a negative electrode current collector as will be described below.

<Nonaqueous Battery>

The "nonaqueous battery" in this specification refers to a battery that does not contain water in an electrolyte. A nonaqueous battery will be abbreviated as a "battery" below.

Figure 1:
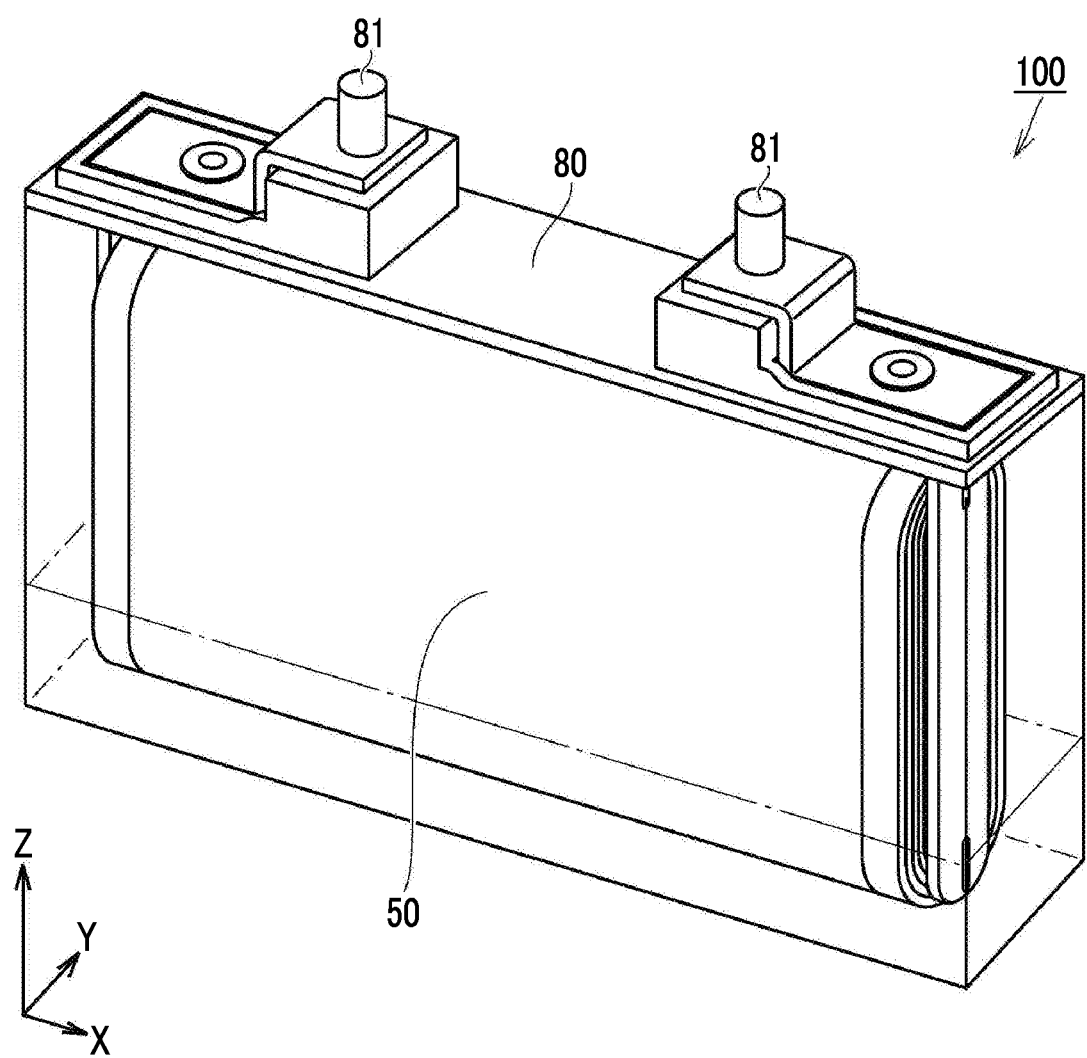
FIG. 1 is a schematic diagram showing an example of a configuration of a nonaqueous battery of the present embodiment.

FIG. 1 is a schematic diagram showing an example of a configuration of a nonaqueous battery of the present embodiment. A battery 100 includes a battery case 80. The battery case 80 has a rectangular shape (flat rectangular parallelepiped shape). However, the battery case of the present embodiment may have a cylindrical shape. The battery case 80 may be made of a metal material such as an Al alloy, stainless steel (SUS), or iron (Fe) or a resin material. The battery case 80 may be made of a composite material of a metal material and a resin material (for example, a bag made of an aluminum laminate film).

The battery case 80 is sealed. A terminal 81 is provided in the battery case 80. The battery case 80 may include a current interruption mechanism (CID), a gas discharge valve, an injection hole, and the like. An electrode group 50 and an electrolytic solution are housed in the battery case 80. The electrode group 50 is electrically connected to the terminal 81.

Figure 2:
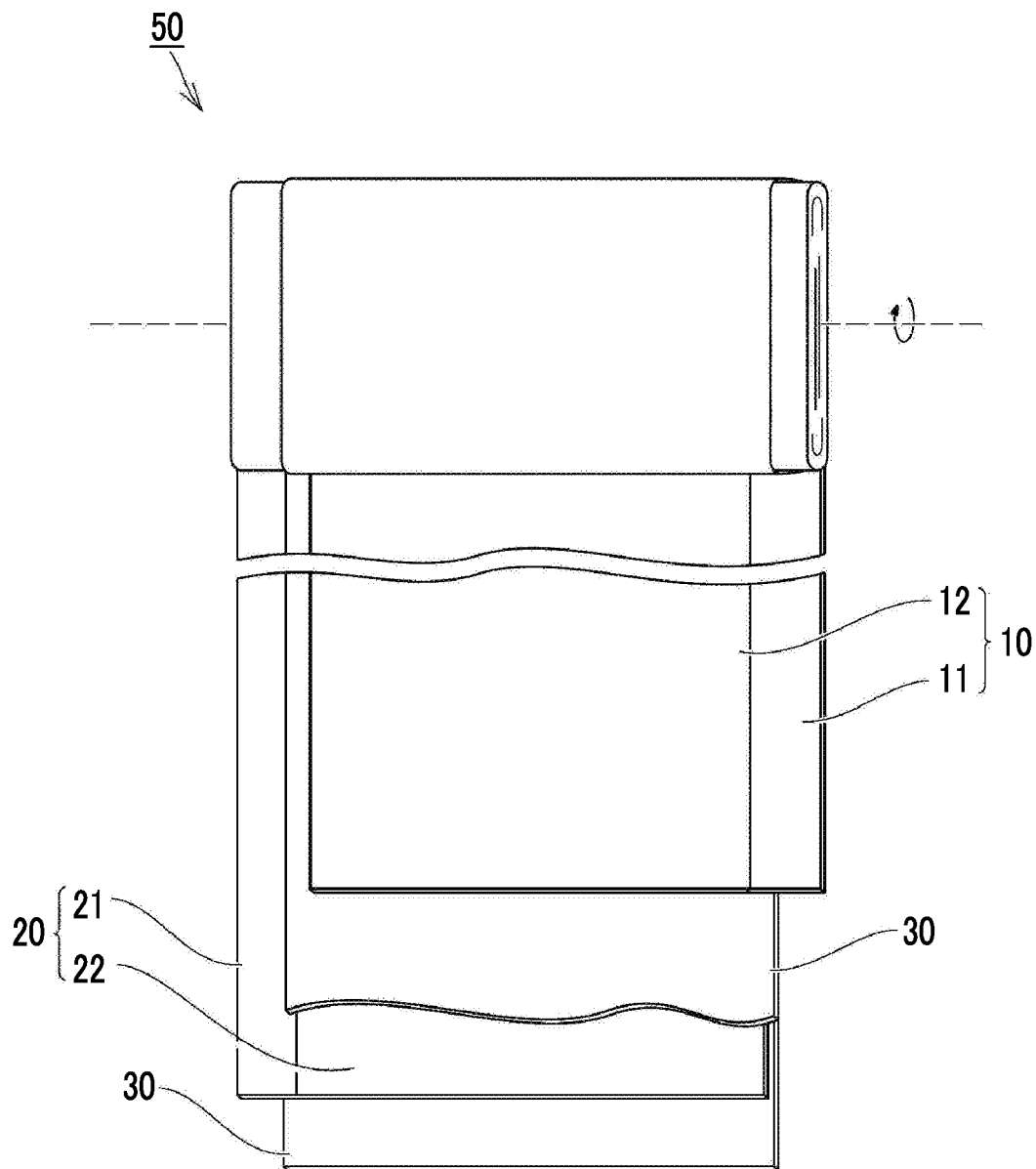
FIG. 2 is a schematic diagram showing an example of a configuration of an electrode group of the present embodiment.

FIG. 2 is a schematic diagram showing an example of a configuration of an electrode group of the present embodiment. The electrode group 50 is of a winding type. That is, the electrode group 50 is obtained by laminating a positive electrode 10, a separator 30, a negative electrode 20, and a separator 30 in that order, and additionally winding these in a spiral shape. The electrode group 50 may be formed in a flat shape. In the winding type electrode group 50, a positive electrode current collector 11 to be described below receives tension. Therefore, the positive electrode current collector 11 is expected to melt easily during a nail penetration test. However, the electrode group of the present embodiment may be a laminate type. The laminate type electrode group may be obtained by laminating a plurality of positive electrodes and negative electrodes alternately while interposing separators therebetween, such as a separator, a positive electrode, a separator, and a negative electrode . . . . According to the present embodiment, even in a laminate type electrode group, temperature increase during a nail penetration test is expected to be small.

<Positive Electrode>

Figure 3:
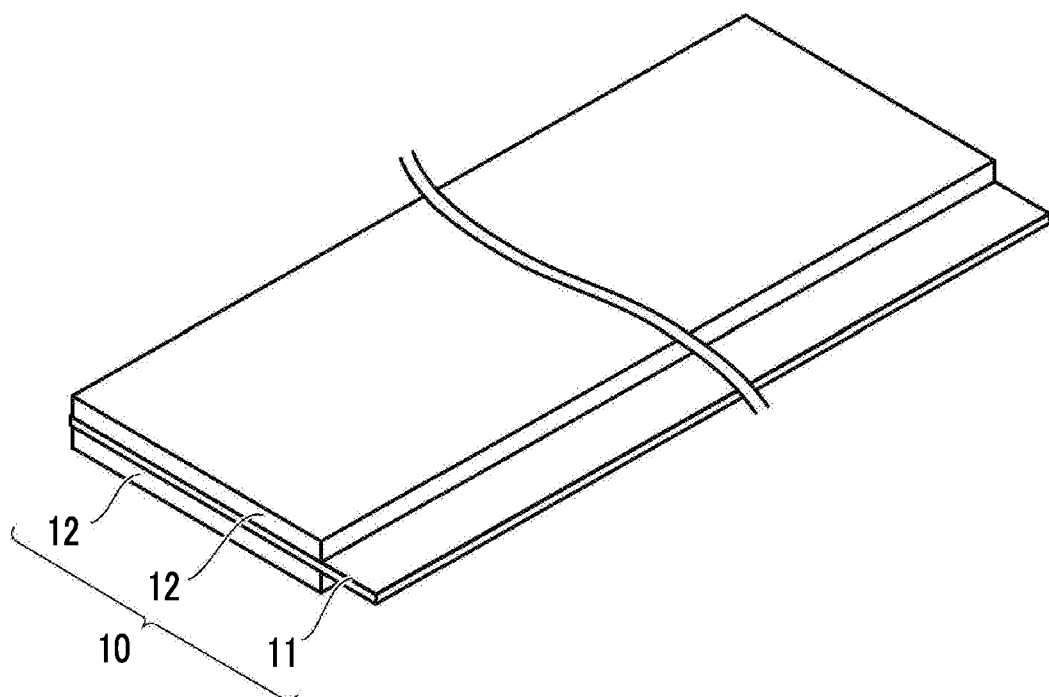
FIG. 3 is a schematic diagram showing an example of a configuration of a positive electrode of the present embodiment.

FIG. 3 is a schematic diagram showing an example of a configuration of a positive electrode of the present embodiment. The positive electrode 10 is a belt-shaped sheet. The positive electrode 10 includes the positive electrode current collector 11 and a positive electrode mixture layer 12. The positive electrode mixture layer 12 is supported on a surface of the positive electrode current collector 11 (current collector). The positive electrode mixture layer 12 includes a positive electrode active material (electrode active material). That is, the battery 100 includes at least a current collector that supports an electrode active material. The positive electrode 10 may include a part of the positive electrode current collector 11 that is exposed from the positive electrode mixture layer 12 for a position at which the terminal 81 is connected.

(Positive Electrode Current Collector)

Figure 4:
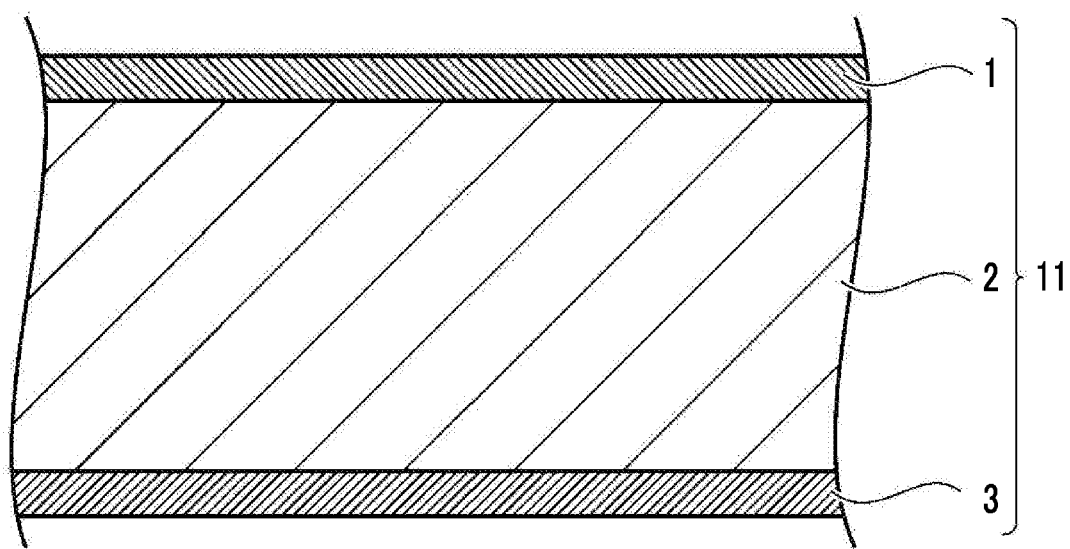
FIG. 4 is a conceptual sectional view of an example of a configuration of a current collector of the present embodiment.

FIG. 4 is a conceptual sectional view showing an example of a configuration of a current collector of the present embodiment. The positive electrode current collector 11 includes a first layer 1, a second layer 2, and a third layer 3. The second layer 2 is interposed between the first layer 1 and the third layer 3.

In this specification, "chemical compositions of the first layer, the second layer, and the third layer" may be measured according to "JIS H 1352: Methods for determination of silicon in aluminum and aluminum alloys," "JIS H 1357: methods for determination of magnesium in aluminum and aluminum alloys," and "JIS H 1307: inductively coupled plasma emission spectroscopic analysis method for aluminum and aluminum alloys."

The chemical compositions of the layers may be measured by, for example, a scanning transmission electron microscope-energy dispersive X-ray analyzer (STEM-EDX), an electron beam microanalyzer (EPMA), or the like. The chemical compositions of the layers are measured at least three times. An arithmetic mean of at least three measurements is used as a measurement result.

(Second Layer)

The second layer 2 is a base layer of the positive electrode current collector 11. The second layer 2 has a chemical composition that is liable to become embrittled at a high temperature (for example, 75° C. or more and 200° C. or less). That is, the second layer 2 includes 0.3 mass % or more and 1 mass % or less of Mg, and 0.2 mass % or more and 0.9 mass % or less of Si, with the remainder being made up of Al.

The second layer 2 may include 0.35 mass % or more and 0.8 mass % or less of Mg, and 0.3 mass % or more and 0.7 mass % or less of Si, with the remainder being made up of Al. Thus, temperature increase during a nail penetration test is expected to be reduced. This is thought to be caused by the fact that the second layer 2 is liable to become embrittled at a high temperature.

Here, the second layer 2 may include 0.35 mass % or more and 0.5 mass % or less of Mg. The second layer 2 may include 0.5 mass % or more and 0.80 mass % or less of Mg. The second layer 2 may include 0.3 mass % or more and 0.5 mass % or less of Si. The second layer 2 may include 0.5 mass % or more and 0.7 mass % or less of Si.

In the second layer 2, a sum of Mg and Si may be 0.7 mass % or more. The sum of Mg and Si may be 1.9 mass % or less, 1.5 mass % or less, or 1.4 mass % or less.

The remainder typically includes only Al. However, the remainder may include unavoidable impurities. Unavoidable impurities refer to impurities that are unavoidably mixed in during production. Examples of the unavoidable impurities include iron (Fe), copper (Cu), manganese (Mn), zinc (Zn), and titanium (Ti). For example, there are desirably 0.1 mass % or less of such unavoidable impurities.

(First layer and third layer) The first layer 1 and the third layer 3 are surface layers of the positive electrode current collector 11. The first layer 1 and the third layer 3 constitute an outer surface of the positive electrode current collector 11. The first layer 1 and the third layer 3 are in contact with the positive electrode mixture layer 12. The first layer 1 and the third layer 3 have a high current collecting capability and a chemical composition that does not easily corrode. That is, the first layer 1 and the third layer 3 each include 99.3 mass % or more of Al. In both the first layer 1 and the third layer 3, a Mg content is less than 0.3 mass % and a Si content is less than 0.2 mass %.

In consideration of a current collecting capability (electron conductivity), a higher purity of Al in the first layer 1 and the third layer 3 is desirable. The first layer 1 and the third layer 3 may include, for example, 99.4 mass % or more of Al, 99.5 mass % or more of Al, 99.6 mass % or more of Al, 99.7 mass % or more of Al, 99.8 mass % or more of Al, or 99.85 mass % or more of Al. The first layer 1 and the third layer 3 may include, for example, 100 mass % or less of Al or 99.95 mass % or less of Al. The first layer 1 and the third layer 3 may have substantially the same chemical composition or different chemical compositions.

In the first layer 1 and the third layer 3, a lower Mg content and a lower Si content are desirable. In both the first layer 1 and the third layer 3, a Mg content may be 0.1 mass % or less and a Si content may be 0.1 mass % or less. Thus, tolerance with respect to high load charging and discharging is expected to be improved and temperature increase during a nail penetration test is expected to be reduced. The first layer 1 and the third layer 3 may be layers that substantially do not include Mg and Si. That is, in both the first layer 1 and the third layer 3, for example, a Mg content may be 0.01 mass % or more and 0.1 mass % or less, and a Si content may be 0.01 mass % or more and 0.1 mass % or less. In both the first layer 1 and the third layer 3, a Mg content may be 0 mass % or more and 0.1 mass % or less and a Si content may be 0 mass % or more and 0.1 mass % or less.

The first layer 1 and the third layer 3 may include unavoidable impurities. Examples of the unavoidable impurities include Fe, Cu, Mn, Zn, and Ti. For example, there are desirably 0.1 mass % or less of such unavoidable impurities.

(Thickness Ratios and the Like)

The positive electrode current collector 11 may have, for example, a thickness of 10 μm or more and 30 μm or less, a thickness of 15 μm or more and 30 μm or less, or a thickness of 15 μm or more and 25 μm or less. In this specification, the "thickness" of each component may be measured by, for example, a micrometer. The thickness of each component may be measured in, for example, a sectional microscope image. The microscope may be an optical microscope or an electron microscope. The thickness of each component is measured at least three places. An arithmetic mean of the thicknesses at least three places is used as a measurement result.

The proportion of the thickness of the second layer 2 with respect to the thickness of the positive electrode current collector 11 may be, for example, 50% or more and 94% or less. The proportion of the thickness of the second layer 2 with respect to the thickness of the positive electrode current collector 11 may be 60% or more. Thus, temperature increase during a nail penetration test is expected to be reduced. This is thought to be caused by the fact that, when a proportion accounted for by the second layer 2 becomes higher, the entire positive electrode current collector 11 is likely to be quickly disconnected due to melting of the second layer 2. The proportion of the thickness of the second layer 2 with respect to the thickness of the positive electrode current collector 11 may be 90% or less. Thus, an improvement in tolerance with respect to high load charging and discharging can be expected. This is thought to be caused by the fact that electron conductivity in the surface layer is improved and the second layer 2 is unlikely to be corroded.

Thus, the proportion of the second layer 2 with respect to the thickness of the positive electrode current collector 11 may be 60% or more and 90% or less. The proportion of the thickness of the second layer 2 with respect to the thickness of the positive electrode current collector 11 may be 75% or more or 80% or more.

The first layer 1 and the third layer 3 may have substantially the same thickness or different thicknesses. The proportions of the first layer 1 and the third layer 3 with respect to the thickness of the positive electrode current collector 11 each may be 3% or more and 25% or less, 5% or more and 20% or less, or 10% or more and 20% or less.

(Method of Producing Current Collector)

A method of producing a current collector is not particularly limited. For example, an Al alloy molten metal containing Mg and Si may be prepared. The Al alloy molten metal is prepared to have substantially the same chemical composition as the second layer 2 described above. When the molten metal is solidified, an ingot is produced. When the ingot is subjected to hot rolling or cold rolling, an Al alloy plate is produced. The thickness of the Al alloy plate may be appropriately changed according to a desired thickness of the second layer 2. The Al alloy plate may have, for example, a thickness of 1 mm to 10 mm.

A pure Al plate or an Al alloy plate (hereinafter referred to as a "pure Al plate or the like" for convenience) having substantially the same chemical composition as the first layer 1 and the third layer 3 described above is prepared. For example, pure Al plates such as A1050, A1060, A1070, A1080, and A1085 (all are alloy numbers defined in "JIS H 4000: Aluminum and aluminum alloy plates and strips") may be used. The thickness of the pure Al plate or the like may be appropriately changed according to desired thicknesses of the first layer 1 and the third layer 3. The pure Al plate or the like may have, for example, a thickness of 0.5 mm to 5 mm.

The pure Al plate or the like, the Al alloy plate, and the pure Al plate or the like are laminated in that order. Thus, a laminate is formed. The laminate is subjected to hot rolling, for example, at 500° C. to 600° C. Thus, a laminated plate having a 3-layer structure is produced. Next, cold rolling is repeated on the laminated plate so that a positive electrode current collector 11 with a desired thickness is obtained. Thus, the positive electrode current collector 11 may be produced.

The positive electrode current collector 11 may be produced according to the next method. According to the same method as above, an Al alloy foil that will become the second layer 2 is produced. The Al alloy foil may have, for example, a thickness of 100 μm to 200 μm. The Al alloy foil is used as a base material, and a coating film is formed on its surface. The coating film is formed to have substantially the same chemical composition as the first layer 1 and the third layer 3. The coating film may be formed by, for example, physical vapor deposition, plating, application of a paste or the like. Examples of the physical vapor deposition include vacuum evaporation, sputtering, and laser ablation. Thus, a coated alloy foil is produced. Then, cold rolling is repeated on the coated alloy foil so that a positive electrode current collector 11 with a desired thickness is obtained. Thus, the positive electrode current collector 11 is produced.

(Positive Electrode Mixture Layer)

The positive electrode mixture layer 12 is formed on a surface of the positive electrode current collector 11 (a surface of the first layer 1 and a surface of the third layer 3). The positive electrode mixture layer 12 may have, for example, a thickness of 10 μm to 200 μm or a thickness of 100 μm to 200 μm. The positive electrode mixture layer 12 may include, for example, 80 mass % to 98 mass % of the positive electrode active material, and 1 mass % to 15 mass % of the conductive material, with the remainder being the binder.

The positive electrode active material is not particularly limited. The positive electrode active material may be, for example, $LiCoO_2$, $LiNiO_2$, $LiMnO_2$, $LiNi_{1/3}CO_{1/3}Mn_{1/3}O_2$, $LiNi_xCo_yMn_zO_2$ (x≥0.5, y≥0.4, z≥0.4, x+y+z=1), $LiNi_{0.82}Co_{0.15}Al_{0.03}O_2$, $LiNi_xCo_yAl_zO_2$ (x≥0.8, y≥0.2, z≥0.2, x+y+z=1), $LiMn_2O_4$, or $LiFePO_4$. One type of positive electrode active material may be used alone or positive electrode active materials of two or more types may be used in combination. The positive electrode active material may have, for example, an average particle size of 1 μm to 30 μm. The average particle size in this specification refers to a particle size at which a cumulative volume from the fine particle side is 50% of the total volume in a volume-based particle size distribution measured in a laser diffraction scattering method.

The conductive material is not particularly limited. The conductive material may be, for example, acetylene black, thermal black, furnace black, scaly graphite, or vapor grown carbon fibers. One type of conductive material may be used alone or conductive materials of two or more types may be used in combination.

The binder is not particularly limited. The binder may be, for example, polyvinylidene fluoride (PVdF), vinylidene fluoride-hexafluoropropylene copolymer (PVdF-HFP), polytetrafluoroethylene (PTFE), polyacrylic acid (PAA), or carboxymethyl cellulose (CMC). One type of binder may be used alone or binders of two or more types may be used in combination.

<Negative Electrode>

Figure 5:
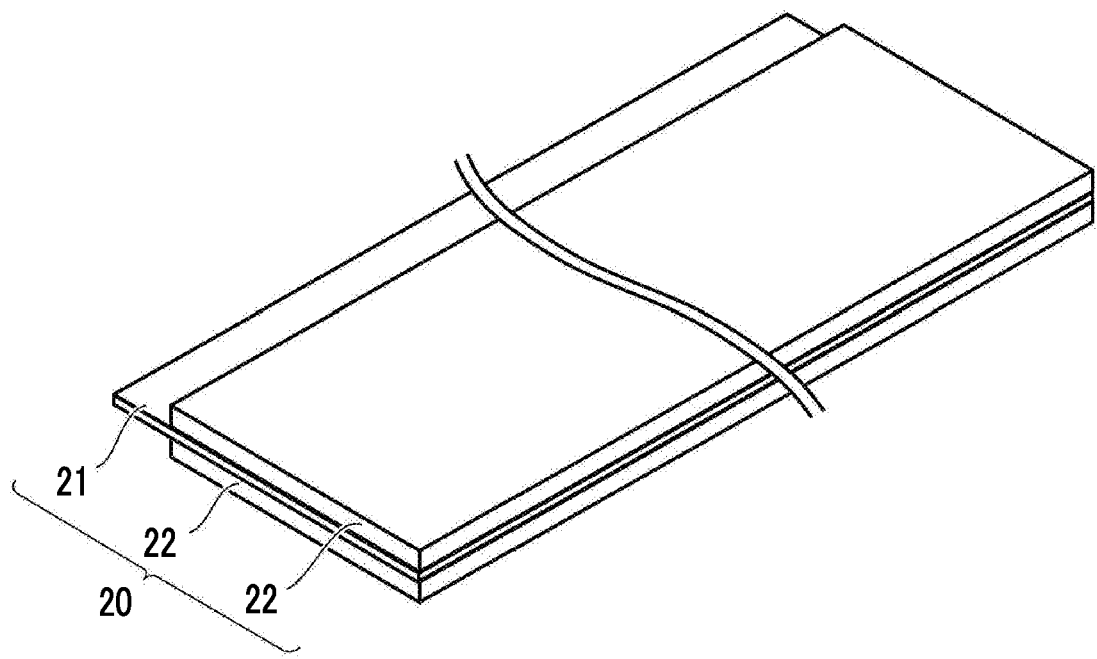
FIG. 5 is a schematic diagram showing an example of a configuration of a negative electrode of the present embodiment.

FIG. 5 is a schematic diagram showing an example of a configuration of a negative electrode of the present embodiment. The negative electrode 20 is a belt-shaped sheet. The negative electrode 20 includes a negative electrode current collector 21 and a negative electrode mixture layer 22. The negative electrode mixture layer 22 is supported on a surface of the negative electrode current collector 21 (current collector). The negative electrode mixture layer 22 includes a negative electrode active material (electrode active material). That is, the battery 100 includes at least a current collector that supports an electrode active material. The negative electrode 20 may include a part of the negative electrode current collector 21 that is exposed from the negative electrode mixture layer 22 for a position at which terminal 81 is connected.

(Negative Electrode Current Collector)

The negative electrode current collector 21 may have, for example, a thickness of 5 μm to 30 μm. The negative electrode current collector 21 may be, for example, a Cu foil. The Cu foil may be a pure Cu foil or a Cu alloy foil. When the negative electrode 20 has a higher potential than a reaction potential between Li ions (charge carriers) and Al in the battery 100 (for example, when the negative electrode active material is lithium titanate), the positive electrode current collector 11 described above may be used as the negative electrode current collector 21. That is, the current collector of the present embodiment may be a negative electrode current collector.

(Negative Electrode Mixture Layer)

The negative electrode mixture layer 22 is formed on surfaces (both front and back surfaces) of the negative electrode current collector 21. The negative electrode mixture layer 22 may have, for example, a thickness of 10 μm to 200 μm, or a thickness of 50 μm to 150 μm. The negative electrode mixture layer 22 includes, for example, 80 mass % to 99.5 mass % of a negative electrode active material, and 0 mass % to 15 mass % of a conductive material, with the remainder being the binder.

The negative electrode active material is not particularly limited. The negative electrode active material may be, for example, graphite, easily graphitizable carbon, non-graphitizable carbon, silicon, silicon oxide, tin, tin oxide, or lithium titanate. One type of negative electrode active material may be used alone or negative electrode active materials of two or more types may be used in combination. For example, a material coated with natural graphite (also referred to as "amorphous coated graphite") by amorphous carbon such as easily graphitizable carbon or non-graphitizable carbon may be used. The negative electrode active material may have, for example, an average particle size of 1 μm to 30 μm.

The conductive material is not particularly limited. The conductive material may be, for example, acetylene black, thermal black, or furnace black. One type of conductive material may be used alone, or conductive materials of two or more types may be used in combination. Here, when a negative electrode active material having high electron conductivity (for example, graphite) is used, the conductive material may not be used.

The binder is not particularly limited. The binder may be, for example, styrene butadiene rubber (SBR), carboxymethyl cellulose (CMC), or PAA. One type of binder may be used alone or binders of two or more types may be used in combination.

<Separator>

The separator 30 is a belt-shaped sheet. The separator 30 is interposed between the positive electrode 10 and the negative electrode 20. The separator 30 is an electrically insulating porous film. The separator 30 may have, for example, a thickness of 10 μm to 50 μm. The separator 30 may be made of, for example, polyethylene (PE), polypropylene (PP) or polyimide (PI). The separator 30 may have a multilayer structure. The separator 30 may be formed by laminating, for example, a PP porous film, a PE porous film, and a PP porous film in that order.

The separator 30 may have a heat resistant layer on its surface (one surface or both surfaces). The heat resistant layer may have, for example, a thickness of 3 μm to 10 μm (typically, 5 μm). The heat resistant layer may include a heat-resistant material and a binder. The heat-resistant material may be, for example, an oxide material (for example, alumina, boehmite, titania, zirconia, and magnesia), or a resin material (for example, aramid, and polyimide). The binder may be, for example, PVdF, PVdF-HFP, PTFE, an ethylene-acrylic acid ester copolymer, or SBR.

<Electrolytic Solution>

The electrolytic solution is impregnated into the electrode group 50. A part of the electrolytic solution accumulates at the bottom of the battery case 80. The dashed line in FIG. 1 indicates a liquid level of the electrolytic solution.

The electrolytic solution is a liquid electrolyte. The electrolytic solution includes a solvent and a Li salt. The Li salt is dissolved in a solvent. The Li salt functions as a supporting electrolyte. The electrolytic solution may include, for example, a Li salt at 0.5 mol/l to 2 mol/l. The Li salt may be, for example, $LiPF_6$, $LiBF_4$, $Li[N(FSO_2)_2]$, or $Li[N(CF_3SO_2)_2]$. One type of Li salt may be used alone or Li salts of two or more types may be used in combination.

The solvent may be, for example, a solvent mixture containing a cyclic carbonate and a chain carbonate. The mixing ratio may be, for example, "cyclic carbonate:chain carbonate=1:9 to 5:5" by volume ratio. Examples of the cyclic carbonate include ethylene carbonate (EC), propylene carbonate (PC), butylene carbonate (BC), and fluoroethylene carbonate (FEC). Examples of the chain carbonate include dimethyl carbonate (DMC), ethyl methyl carbonate (EMC), and diethyl carbonate (DEC). As each of the cyclic carbonate and the chain carbonate, one type thereof may be used alone or two or more types thereof may be used in combination.

The solvent may include, for example, a lactone, a cyclic ether, a chain ether, or a carboxylic ester. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic ester include methyl formate (MF), methyl acetate (MA), and methyl propionate (MP).

The electrolytic solution may include various functional additives in addition to the solvent and the Li salt. The electrolytic solution may include, for example, 1 mass % to 5 mass % of a functional additive. Examples of the functional additive include a gas generating agent (overcharging additive) and a film forming agent. Examples of the gas generating agent include cyclohexylbenzene (CHB) and biphenyl (BP). Examples of the film forming agent include vinylene carbonate (VC), vinyl ethylene carbonate (VEC), $Li[B(C_2O_4)_2]$, $LiPO_2F_2$, propanesultone (PS), and ethylene sulfite (ES).

Here, in the present embodiment, a gel electrolyte or a solid electrolyte may be used in place of the electrolytic solution. According to the present embodiment, also if the electrolyte is a gel electrolyte or a solid electrolyte, temperature increase during a nail penetration test is expected to be reduced.

<Applications>

In the nonaqueous battery of the present embodiment, temperature increase during a nail penetration test is expected to be reduced and tolerance with respect to high load charging and discharging is expected to increase. Therefore, the nonaqueous battery of the present embodiment is suitable for applications for which high load charging and discharging are required. Examples of such applications include power batteries for a hybrid vehicle (HV), a plug-in hybrid vehicle (PHV), and an electric vehicle (EV). However, the nonaqueous battery of the present embodiment is not limited to a power battery. The nonaqueous battery of the present embodiment can be used for any application.

Examples will be described below. However, the following examples do not limit the scope of the claims.

Example 1

1. Production of Positive Electrode Current Collector

The following materials were prepared. Pure Al plate (Mg: 0.1 mass % or less, Si: 0.1 mass % or less, Al: 99.3 mass % or more, thickness: 1 mm), Al alloy plate (Mg: 0.5 mass %, Si: 0.5 mass %, Al: the remainder, thickness: 2 mm)

The pure Al plate, the Al alloy plate, and the pure Al plate were laminated in that order. Thereby, the laminate was formed. The laminate was subjected to hot rolling at 550° C. Thus, a laminated plate having a 3-layer structure was produced. Next, the laminated plate was repeatedly subjected to cold rolling such that the total thickness became 15 μm. Thus, a positive electrode current collector was produced.

The positive electrode current collector obtained above included a first layer, a second layer, and a third layer. The second layer was interposed between the first layer and the third layer. The first layer and the third layer constituted outer surfaces of the positive electrode current collector. The second layer included 0.5 mass % of Mg and 0.5 mass % of Si, with the remainder being made up of Al. The first layer and the third layer included 99.3 mass % or more of Al. In both of the first layer and the third layer, there was less than 0.3 mass % of Mg and less than 0.2 mass % of Si.

In the sectional microscope image of the positive electrode current collector, thickness ratios between the layers were measured. The proportions of the thicknesses of the first layer and the third layer with respect to the thickness (15 μm) of the positive electrode current collector each were 3%. The proportion of the thickness of the second layer with respect to the thickness (15 μm) of the positive electrode current collector was 94%.

2. Production of Positive Electrode

The following materials were prepared. Positive electrode active material: $LiNi_{1/3}Co_{1/3}Mm_{1/3}O_2$, conductive material: acetylene black, binder: PVdF, and solvent: N-methyl-2-pyrrolidone (NMP)

The positive electrode active material, the conductive material, the binder and the solvent were mixed to prepare a positive electrode paste. The positive electrode paste was applied to surfaces (both front and back surfaces) of the positive electrode current collector obtained above and dried. Thereby, the positive electrode mixture layer was formed. The positive electrode mixture layer was rolled. The rolled positive electrode mixture layer had a thickness of 150 μm. Thereby, a positive electrode was produced. The positive electrode was cut into a belt shape.

3. Production of Negative Electrode

The following materials were prepared. Negative electrode active material: amorphous coated graphite, binder: CMC, SBR, solvent: water (deionized water), negative electrode current collector: Cu foil (thickness: 10 μm)

The negative electrode active material, the binder, and the solvent were mixed to prepare a negative electrode paste. The negative electrode paste was applied to surfaces (both front and back surfaces) of the negative electrode current collector and dried. Thereby, a negative electrode mixture layer was formed. The negative electrode mixture layer was formed so that a capacity per unit area was 1.7 to 2.0 times a capacity per unit area of the positive electrode mixture layer. The negative electrode mixture layer was rolled. The rolled negative electrode mixture layer had a thickness of 80 μm. Thereby, a negative electrode was produced. The negative electrode was cut into a belt shape.

4. Assembly

A belt-shaped separator was prepared. The separator had a thickness of 15 μm. The separator was formed by laminating a PP porous film, a PE porous film, and a PP porous film in that order.

The positive electrode, the separator, the negative electrode, and the separator were laminated in that order, and additionally, these were wound in a spiral shape to produce an electrode group. The electrode group was formed into a flat shape. The width dimension (the size in the X axis direction in FIG. 1 and FIG. 2) of the formed electrode group was 130 mm. The height dimension (the size in the Z axis direction in FIG. 1 and FIG. 2) of the formed electrode group was 50 mm. A terminal was connected to the electrode group. The electrode group was housed in a battery case.

An electrolytic solution having the following composition was prepared. Solvent: [EC:EMC:DMC=3:3:4], Li salt: $LiPF_6$ (1 mol/l)

The electrolytic solution was injected into the battery case. The battery case was sealed. Thus, a battery according to Example 1 was produced.

Examples 2 to 13

Batteries were produced in the same manner as in the production method in Example 1 except that chemical compositions of the first layer, the second layer, and the third layer and thickness ratios of the layers were changed as shown in the following Table 1.

Battery resistances after 1 cycle and 1000 cycles were measured. A resistance increase rate was calculated by the following formula: resistance increase rate=[battery resistance after 1000 cycles]÷[battery resistance after 1 cycle]× 100. The results are shown in the following Table 1. A lower resistance increase rate indicates a higher tolerance with respect to high load charging and discharging.

2. Nail Penetration Test

A nail (N nail, symbol "N65") was prepared. The battery was fully charged. The battery was heated to 60° C. The nail was pierced into the battery. At a position 1 cm away from a position at which the nail was pierced in, the temperature of the battery case was monitored. The peak temperature after the nail was pierced in was measured. The results are shown in the following Table 1. A lower peak temperature indicates a smaller temperature increase during the nail penetration test.

TABLE 1

List of samples

| | Current collector | | | | | | Thickness ratio | | | Evaluation | |
|---|---|---|---|---|---|---|---|---|---|---|---|
| | First layer, third layer (surface layers) | | | Second layer (base layer) | | | First | Second | Third | High load charging and discharging | Nail penetration test |
| | Mg Mass % | Si Mass % | Al Mass % | Mg Mass % | Si Mass % | Al Mass % | layer % | layer % | layer % | Resistance increase rate | Peak temperature ° C. |
| Comparative Example 1 | 0.1 or less | 0.1 or less | 99.3 or more | — | — | — | 100 | — | — | 110 | 350 |
| Comparative Example 2 | — | — | — | 0.5 | 0.5 | Remainder | — | 100 | — | 150 | 150 |
| Example 1 | 0.1 or less | 0.1 or less | 99.3 or more | 0.5 | 0.5 | Remainder | 3 | 94 | 3 | 120 | 80 |
| Example 2 | 0.1 or less | 0.1 or less | 99.3 or more | 0.5 | 0.5 | Remainder | 25 | 50 | 25 | 110 | 145 |
| Example 3 | 0.1 or less | 0.1 or less | 99.3 or more | 0.5 | 0.5 | Remainder | 5 | 90 | 5 | 110 | 80 |
| Example 4 | 0.1 or less | 0.1 or less | 99.3 or more | 0.5 | 0.5 | Remainder | 10 | 80 | 10 | 110 | 90 |
| Example 5 | 0.1 or less | 0.1 or less | 99.3 or more | 0.5 | 0.5 | Remainder | 20 | 60 | 20 | 110 | 100 |
| Example 6 | 0.1 or less | 0.1 or less | 99.3 or more | 0.3 | 0.5 | Remainder | 12.5 | 75 | 12.5 | 110 | 150 |
| Example 7 | 0.1 or less | 0.1 or less | 99.3 or more | 0.35 | 0.5 | Remainder | 12.5 | 75 | 12.5 | 110 | 95 |
| Example 8 | 0.1 or less | 0.1 or less | 99.3 or more | 0.8 | 0.5 | Remainder | 12.5 | 75 | 12.5 | 110 | 100 |
| Example 9 | 0.1 or less | 0.1 or less | 99.3 or more | 1 | 0.5 | Remainder | 12.5 | 75 | 12.5 | 110 | 160 |
| Example 10 | 0.1 or less | 0.1 or less | 99.3 or more | 0.5 | 0.2 | Remainder | 12.5 | 75 | 12.5 | 110 | 155 |
| Example 11 | 0.1 or less | 0.1 or less | 99.3 or more | 0.5 | 0.3 | Remainder | 12.5 | 75 | 12.5 | 110 | 98 |
| Example 12 | 0.1 or less | 0.1 or less | 99.3 or more | 0.5 | 0.7 | Remainder | 12.5 | 75 | 12.5 | 110 | 103 |
| Example 13 | 0.1 or less | 0.1 or less | 99.3 or more | 0.5 | 0.9 | Remainder | 12.5 | 75 | 12.5 | 110 | 165 |

Comparative Examples 1 and 2

Batteries were produced in the same manner as in the production method in Example 1 except that a positive electrode current collector having a single layer structure including a chemical composition shown in the following Table 1 was used.

<Evaluation>

1. High Load Charging and Discharging

"Charge→rest (stop)→discharge" was set as 1 charge-discharge cycle and the charge-discharge cycle was repeated 1000 times.

Charging: 2.5 C×240 seconds, rest: 120 seconds, discharging: 30 C×20 seconds

Here, "1 C" indicates a current at which a fully charged capacity is discharged in one hour. For example, "2.5 C" indicates a current of 2.5 times 1 C.

<Results>

In Comparative Example 1, temperature increase during the nail penetration test was large. It is thought that, after the nail was pierced in, since the positive electrode current collector did not melt, a time over which a short-circuit state continued was long, and the temperature increase was large.

In Comparative Example 2, tolerance with respect to high load charging and discharging was low. This is thought to have been caused by the fact that a current collecting capability of the positive electrode current collector was low. The positive electrode current collector of Comparative Example 2 had a chemical composition that easily melted initially like the second layer in Examples 1 to 5. However, in Comparative Example 2, temperature increase during the nail penetration test was larger than those in Examples 1 to 5. The reason for this is thought to be that, when the surface of the positive electrode current collector in the battery was corroded, the positive electrode current collector did not easily melt.

Examples 1 to 13 had a smaller temperature increase during the nail penetration test and had a higher tolerance with respect to high load charging and discharging than Comparative Examples 1 and 2.

Based on the results of Examples 6 to 13, it was found that, when the second layer included 0.35 mass % or more and 0.8 mass % or less of Mg, and 0.3 mass % or more and 0.7 mass % or less of Si, with the remainder being made up of Al, temperature increase during the nail penetration test tended to be smaller.

Based on the results of Examples 1 to 5, it was found that, when the proportion of the thickness of the second layer with respect to the thickness of the positive electrode current collector was 60% or more and 90% or less, tolerance with respect to high load charging and discharging was improved and temperature increase during the nail penetration test tended to be smaller.

The above embodiments and examples are only examples and should not be considered as restrictive. The technical scope defined by the description of the claims include meanings equivalent to the scope of the claims and all modifications within the scope of the claims.

What is claimed is:

1. A nonaqueous battery comprising:
   a current collector that supports an electrode active material, wherein
   the current collector includes a first layer, a second layer and a third layer,
   the second layer is interposed between the first layer and the third layer,
   the second layer includes 0.3 mass % or more and 1 mass % or less of magnesium and 0.2 mass % or more and 0.9 mass % or less of silicon, with a remainder being made up of aluminum,
   the first layer and the third layer constitute outer surfaces of the current collector, and
   the first layer and the third layer each include 99.3 mass % or more of aluminum, more than 0 mass % and less than 0.3 mass % of magnesium, and more than 0 mass % and less than 0.2 mass % of silicon, and
   a thickness of the first layer and a thickness of the third layer are each in the range of from 0.45 µm to 1.875 µm.

2. The nonaqueous battery according to claim 1, wherein the second layer includes 0.35 mass % or more and 0.8 mass % or less of magnesium and 0.3 mass % or more and 0.7 mass % or less of silicon, with the remainder being made up of aluminum.

3. The nonaqueous battery according to claim 1, wherein a proportion of a thickness of the second layer with respect to a thickness of the current collector is 60% or more and 90% or less.

4. The nonaqueous battery according to claim 1, wherein, the first layer and the third layer each include more than 0 mass % and 0.1 mass % or less of magnesium, and more than 0 mass % and 0.1 mass % or less of silicon.

* * * * *